United States Patent
Albinus et al.

(10) Patent No.: US 10,618,849 B2
(45) Date of Patent: Apr. 14, 2020

(54) METHOD FOR PRODUCING A HYDROPHOBIC HEAT-INSULATING MOLDED BODY

(71) Applicant: Evonik Operations GmbH, Essen (DE)

(72) Inventors: Uwe Albinus, Bad Vilbel (DE); Johannes Daenner, Kaltensundheim (DE); Manfred Dannehl, Kahl am Main (DE); Matthias Schindler, Gelsenkirchen (DE); Gabriele Gaertner, Hanau (DE)

(73) Assignee: Evonik Operations GmbH, Essen (DE)

( * ) Notice: Subject to any disclaimer, the term of this patent is extended or adjusted under 35 U.S.C. 154(b) by 476 days.

(21) Appl. No.: 15/501,370

(22) PCT Filed: Jul. 27, 2015

(86) PCT No.: PCT/EP2015/067102
§ 371 (c)(1),
(2) Date: Feb. 2, 2017

(87) PCT Pub. No.: WO2016/020215
PCT Pub. Date: Feb. 11, 2016

(65) Prior Publication Data
US 2017/0233297 A1 Aug. 17, 2017

(30) Foreign Application Priority Data
Aug. 8, 2014 (EP) .................................... 14180309

(51) Int. Cl.
| | |
|---|---|
| *B28B 3/12* | (2006.01) |
| *B28B 1/52* | (2006.01) |
| *C04B 35/82* | (2006.01) |
| *C04B 41/49* | (2006.01) |
| *C04B 30/02* | (2006.01) |
| *C04B 30/00* | (2006.01) |
| *C04B 41/64* | (2006.01) |
| *C04B 41/00* | (2006.01) |
| *C04B 32/00* | (2006.01) |
| *B28B 11/04* | (2006.01) |
| *C04B 35/64* | (2006.01) |
| *F16L 59/02* | (2006.01) |
| *C04B 111/27* | (2006.01) |
| *C04B 111/28* | (2006.01) |

(52) U.S. Cl.
CPC ................ *C04B 35/82* (2013.01); *B28B 1/52* (2013.01); *B28B 3/123* (2013.01); *B28B 11/04* (2013.01); *C04B 30/00* (2013.01); *C04B 30/02* (2013.01); *C04B 32/00* (2013.01); *C04B 35/64* (2013.01); *C04B 41/009* (2013.01); *C04B 41/4944* (2013.01); *C04B 41/64* (2013.01); *F16L 59/028* (2013.01); *C04B 2111/27* (2013.01); *C04B 2111/28* (2013.01); *C04B 2235/3418* (2013.01); *C04B 2235/3826* (2013.01); *C04B 2235/5216* (2013.01); *C04B 2235/614* (2013.01); *C04B 2235/77* (2013.01); *C04B 2235/9607* (2013.01)

(58) Field of Classification Search
CPC .................................. B28B 1/52; B28B 3/123
See application file for complete search history.

(56) References Cited

U.S. PATENT DOCUMENTS

2014/0150242 A1* 6/2014 Kratel ..................... C04B 30/02
29/527.1

FOREIGN PATENT DOCUMENTS

| | | |
|---|---|---|
| DE | 10 2007 042 000 A1 | 3/2009 |
| DE | 10 2010 005 800 A1 | 7/2011 |
| EP | 1 988 228 A2 | 11/2008 |
| EP | 1 988 228 A3 | 11/2008 |
| WO | WO 2013/013714 A1 | 1/2013 |
| WO | WO-2013013714 A1 * | 1/2013 ............. C04B 41/64 |

OTHER PUBLICATIONS

International Search Report dated Oct. 14, 2015 in PCT/EP2015/067102 filed Jul. 27, 2015.
European Search Report dated Feb. 2, 2015, in European Patent Application No. 14180309.8 filed Aug. 8, 2014.

* cited by examiner

*Primary Examiner* — Dah-Wei D. Yuan
*Assistant Examiner* — Kristen A Dagenais-Englehart
(74) *Attorney, Agent, or Firm* — Oblon, McClelland, Maier & Neustadt, L.L.P.

(57) ABSTRACT

Process for the production of a hydrophobic thermal-insulation moulding, where a hydrophilic thermal-insulation moulding is brought into contact with a hydrophobizing agent in vapour form with formation of a thermal-insulation moulding coated with hydrophobizing agent, and this is then subjected to a press process and during the press process and/or after the press process is reacted with the hydrophobizing agent with formation of the hydrophobic thermal-insulation moulding, where
a) the density of the hydrophobic thermal-insulation moulding after the press process and after the reaction with the hydrophobizing agent is from 100 to 250 kg/m³, and
b) the density of the hydrophilic thermal-insulation moulding on contact with the hydrophobizing agent is from 50% to less than 100% of the density of the hydrophobic thermal-insulation moulding.

20 Claims, No Drawings

METHOD FOR PRODUCING A HYDROPHOBIC HEAT-INSULATING MOLDED BODY

The invention relates to a process for the production of a hydrophobic thermal-insulation moulding comprising silica.

The person skilled in the art is aware that hydrophobic silicas are not adequately amenable to compaction and do not give satisfactory results in press processes. A mixture comprising hydrophobic silica likewise does not give satisfactory results in press processes.

EP-A-1988228 therefore proposes adding organosilanes during the mixing procedure for a thermal-insulation mixture based on fumed silica, opacifier and fibre materials. An important factor here for achieving full hydrophobization is vigorous, homogeneous mixing of the components. Immediately after the addition, this mixture is deformable and can be used successfully in a press process. The reaction of the organosilanes with the silanol groups of the silica here takes place during the press procedure or immediately thereafter.

WO2011/069923 discloses use of low-volatility organosilanes or organosiloxanes for the hydrophobization of a thermal-insulation mixture comprising fumed silica. These adsorb onto the pulverulent individual constituents of the thermal-insulation mixture, without any subsequent chemical reaction during or after a press procedure.

WO2011/150987 finally uses solid hydrophobizing agents with softening point from −30° C. to 600° C. for the production of thermal-insulation sheets.

It has been found that in the processes mentioned where the hydrophobizing agent is added before the press procedure it is difficult to obtain stable mouldings, in particular when the hydrophobization produces gaseous products.

WO2013/013714 therefore also proposes that the hydrophobization be carried out after the press procedure. At least one organosilane in the form of vapour is used here, at subatmospheric or superatmospheric pressure, to treat the hydrophilic moulding present in a chamber after the press procedure.

Both of the processes mentioned in the prior art that lead to hydrophobic thermal-insulation mouldings have disadvantages, said processes being the addition of the hydrophobizing agent to the pulverulent thermal-insulation mixture before the press process and hydrophobization after the press process to give thermal-insulation mouldings.

The processes where the hydrophobizing agent is added before the press process have the disadvantage that the density of the silicas increases in a manner that is difficult to control during the press process and leads to inhomogeneity of material distribution, and also to variations in mechanical stability of the mouldings.

The processes where hydrophobization takes place after the press process have the disadvantage that an additional step is necessary and that penetration of the pressed material is non-uniform and incomplete. When processes operate at superatmospheric pressure, adverse effects on the material are in particular observed.

The technical object of the present invention therefore consisted in providing a process which can produce a hydrophobic thermal-insulation moulding and which minimizes said disadvantages.

It would moreover be desirable that said process could be carried out continuously. WO 20051028195 provides the continuous production of hydrophilic thermal-insulation sheets by using a belt press. However, in that context it has not been found possible to achieve continuous hydrophobization of said thermal-insulation sheets.

Another technical object of the present invention was therefore to provide a process which permits continuous production of hydrophobic thermal-insulation sheets.

The invention provides a process for the production of a hydrophobic thermal-insulation moulding, in particular of a thermal-insulation sheet, where a hydrophilic thermal-insulation moulding composed of a thermal-insulation mixture comprising a fine-particle silica, IR opacifier and fibre material is brought into contact with a hydrophobizing agent in vapour form with formation of a thermal-insulation moulding coated with hydrophobizing agent, and this is then subjected to a press process and during the press process and/or after the press process is reacted with the hydrophobizing agent with formation of the hydrophobic thermal-insulation moulding, where a) the density of the hydrophobic thermal-insulation moulding after the press process and after the reaction with the hydrophobizing agent is from 100 to 250 kg/m$^3$, preferably from 130 to 200 kg/m$^3$, and b) the density of the hydrophilic thermal-insulation moulding on contact with the hydrophobizing agent is from 50% to less than 100%, preferably from 50 to 99%, particularly preferably from 60 to 95%, very particularly preferably from 70 to 90%, of the density of the hydrophobic thermal-insulation moulding.

Essential feature of the invention is contact between a hydrophobizing agent in the form of vapour and a hydrophilic thermal-insulation moulding. In contrast to the prior art, in which the hydrophobizing agent is added to a pulverulent thermal-insulation mixture before the press process, the process of the invention permits production of a thermal-insulation moulding that is uniformly and entirely hydrophobic.

The expression "hydrophobic thermal-insulation moulding" means that when water-methanol wettability of same is determined sedimentation is observed at 15% by volume of methanol or more, preferably at 20% by volume of methanol or more, particularly preferably at 25% by volume of methanol or more, in particular at from 25 to 50% by volume of methanol.

Water-methanol wettability is determined by weighing portions from different regions of the hydrophobic thermal-insulation moulding, in each case 0.2 g±0.005 g, into transparent centrifuge tubes. 8.0 ml of a methanol/water mixture using respectively 10, 20, 30, 40, 50, 60, 70 and 80% by volume of methanol are added to each weighed quantity. The sealed tubes are shaken for 30 seconds and then centrifuged for 5 minutes at 2500 min$^{-1}$. The sediment volumes are read off, converted to percentages, and plotted on a graph against methanol content (% by volume). The water-methanol wettability value described here corresponds to the inflection point of this curve. The higher the methanol content value (% by volume), the greater the hydrophobicity.

Accordingly, a thermal-insulation moulding exhibiting sedimentation at methanol content of 15% by volume or more is regarded as hydrophobic. The hydrophilic thermal-insulation moulding is obtained via compaction of the thermal-insulation mixture.

A hydrophilic thermal-insulation moulding is converted to a hydrophobic thermal-insulation moulding via reaction of the superficial hydroxy groups of at least one of its constituents with a hydrophobizing agent.

According to the invention, hydrophilic and hydrophobic thermal-insulation mouldings are structures that are intrinsically stable and can be handled, whereas the thermal-insulation mixture is composed of pulverulent constituents and fibres. The distribution of the constituents of the thermal-insulation mixture is very substantially homogeneous in the hydrophilic, and also hydrophobic, thermal-insulation moulding.

It is preferable that thermal-insulation mixture and thermal-insulation moulding comprise only subordinate quantities of binder, or are entirely free therefrom. The expression "subordinate" means that these proportions make no significant contribution to the stability of the thermal-insulation moulding.

According to the invention, the hydrophilic thermal-insulation moulding is brought into contact with a hydrophobizing agent. The contact temperature $T_{contact}$ here is selected in such a way that no, or only a subordinate extent of, hydrophobization reaction takes place. $T_{contact}$ is generally below or equal to 80% of the reaction temperature of the respective hydrophobizing agent. It is preferable that $T_{contact}$ is from −30 to 150° C., particularly from 20 to 100° C.

During the subsequent press process and/or thereafter the hydrophobizing agent will react with reactive groups on the surface of the components of the thermal-insulation mixture to form the hydrophobic thermal-insulation moulding. The temperature $T_{reaction}$ depends inter alia on the nature of the hydrophobizing agent. It is preferable that $T_{reaction}$ is from 50 to 500° C., particularly from 100 to 300° C.

It is preferable that the contact time and the reaction time are in each case from 1 minute to 1 hour, particularly from 5 to 10 minutes.

The process of the invention is preferably implemented in a manner where the contact and the reaction of the hydrophobizing agent with the hydrophilic thermal-insulation moulding takes place in a chamber, and the hydrophobizing agent here is introduced into the chamber until the pressure difference $\Delta p$ is ≥20 mbar, where $\Delta p = p_2 - p_1$, and $p_1$=pressure in the chamber before introduction of the hydrophobizing agent, $p_2$=pressure in the chamber at which the introduction of the hydrophobizing agent is stopped. The process of the invention is preferably implemented in a manner such that 200 mbar≤$\Delta p$≤5 bar, particularly 500 mbar≤$\Delta p$≤2000 mbar, very particularly 500 mbar≤$\Delta p$≤1000 mbar.

In one particular embodiment of the invention, the process is implemented in a manner such that pressure in the chamber before introduction of the hydrophobizing agent is smaller than atmospheric pressure. In a particularly advantageous embodiment, 0.1 mbar≤p1≤atmospheric pressure. Particular preference is given to a variant where 1 mbar≤p1≤500 mbar. In this particular embodiment, the hydrophobizing agent is therefore introduced into an evacuated chamber. In this subatmospheric-pressure process the hydrophobizing agent is "sucked" into even the finest pores of the hydrophilic thermal-insulation moulding, and achieves ideal distribution.

In another particular embodiment of the invention, the process is implemented in a manner such that pressure in the chamber before introduction of the hydrophobizing agent is atmospheric pressure or above. In an advantageous embodiment here, atmospheric pressure≤p1≤10 bar. In this super-atmospheric-pressure process the hydrophobizing agent is "forced" into the pores of the hydrophilic thermal-insulation moulding, and thus achieves ideal distribution.

According to the invention, fine-particle silicas are used. These have a specific structure. Primary particles of size from 5 to 50 nm accrete to give larger aggregates which in turn combine to give even larger structures, the agglomerates.

Fumed silicas can preferably be used. They are produced via flame hydrolysis of volatile silicon compounds such as organic and inorganic chlorosilanes. This process uses a flame formed via combustion of hydrogen and of an oxygen-containing gas for the reaction of a hydrolysable silicon halide in the form of vapour or in gaseous form. The combustion flame here provides water for the hydrolysis of the silicon halide, and sufficient heat for the hydrolysis reaction. Silica produced in this way is termed fumed silica. This process initially forms primary particles which are almost free from interior pores. These primary particles then fuse during the process by way of what are known as "sinter necks" to give aggregates. By virtue of this structure, fumed silica is an ideal thermal-insulation material, since the aggregate structure provides adequate mechanical stability, minimizes heat transfer due to conductivity in the solid by way of the "sinter necks", and produces sufficiently high porosity. The BET surface area of the fumed silica can be from 50 to 1000 $m^2/g$. Fumed silicas with BET surface area of from 150 to 600 $m^2/g$ are particularly preferred, and those with from 200 to 400 $m^2/g$ are very particularly preferred.

The process of the invention can equally use precipitated silicas. These are obtained via reaction of an alkali water glass with sulphuric acid. The precipitate is filtered, washed and dried. The BET surface area of the precipitated silica can be from 20 to 2000 $m^2/g$. Precipitated silicas have proved to be less effective than fumed silicas in their use as thermal-insulation mouldings. However, the precipitated silica disclosed in WO2010/091921, with modified tamped density 70 g/l or less, provides an alternative to fumed silicas.

The proportion of the fine-particle silica is preferably from 70 to 95% by weight, based on the thermal-insulation mixture.

The opacifier is preferably selected from the group consisting of titanium oxide, zirconium oxide, ilmenite, iron titanate, iron oxide, zirconium silicate, silicon carbide, manganese oxide and carbon black. It is preferable that these opacifiers have a maximum at from 1.5 to 10 μm in the infrared region of the spectrum. The size of these particles is preferably from 0.5 to 15 μm. The proportion thereof in the thermal-insulation mixture is preferably from 2 to 20% by weight.

Fibres are used for mechanical reinforcement. These fibres can derive from an inorganic or organic source. Examples of inorganic fibres that can be used are glass wool, rock wool, basalt fibres, slag wool and ceramic fibres, these deriving from melts comprising aluminium and/or silicon dioxide, and also from other inorganic metal oxides. Examples of pure silicon dioxide fibres are silica fibres. Examples of organic fibres which can be used are cellulose fibres, textile fibres and synthetic fibres. The diameter of the fibres is preferably from 1 to 12 μm, particularly preferably from 6 to 9 μm, and the length is preferably from 1 to 25 mm, particularly preferably from 3 to 10 mm.

The proportion of the fibre material is preferably from 3 to 10% by weight, based on the thermal-insulation mixture.

The thermal-insulation mixture can moreover comprise inorganic filler materials. Materials that can be used are arc silicas, $SiO_2$-containing fly ash produced via oxidation reactions of volatile silicon monoxide during electrochemical production of silicon or ferrosilicon. It is moreover possible to use naturally occurring $SiO_2$-containing compounds such as diatomaceous earths and kieselguhrs. It is likewise possible to add thermally expanded minerals such as perlites and vermiculites, and fine-particle metal oxides such as aluminium oxide, titanium dioxide, iron oxide. The proportion of the inorganic filler materials is preferably not more than 10% by weight, based on the thermal-insulation mixture. In one particularly preferred embodiment, the thermal-insulation mixture is very substantially free from these inorganic additives.

Materials that can be used as hydrophobizing agent are especially organosilanes. Selection of these is not subject to any restriction, but a factor requiring consideration is that the hydrophobizing agent according to the invention is used in the form of vapour. One or more organosilanes from the group consisting of $R_n$—Si—$X_{4-n}$, $R_3$Si—Y—Si$R_3$, $R_n$Si$_n$O$_n$, $(CH_3)_3$—Si—$(O$—Si$(CH_3)_2)_n$—OH, HO—Si$(CH_3)_2$—$(O$—Si$(CH_3)_2)_n$—OH, where n=from 1 to 8; R=—H, —$CH_3$, —$C_2H_5$; X=—Cl, —Br; —$OCH_3$, —$OC_2H_6$, —$OC_3H_8$, Y=NH, O, can preferably be used. Explicit mention may be made of the following: $(CH_3)_3$SiCl, $(CH_3)_2$SiCl$_2$, $CH_3$SiCl$_3$, $(CH_3)_3$SiOC$_2$H$_6$, $(CH_3)_2$Si$(OC_2H_6)_2$, $CH_3$Si$(OC_2H_6)_3$, $(CH_3)_3$SiNHSi$(CH_3)_3$, $(CH_3)_3$SiOSi$(CH_3)_3$, the cyclic siloxanes $(CH_3)_8$Si$_4$O$_4$ and $(CH_3)_6$Si$_3$O$_3$, and the low-molecular-weight polysiloxanol $(CH_3)_3$Si$(OSi(CH_3)_2)_4$OH. Particular preference is given to $(CH_3)_3$SiCl, $(CH_3)_2$SiCl$_2$, $CH_3$SiCl$_3$, $(CH_3)_3$SiNHSi$(CH_3)_3$ and $(CH_3)_8$Si$_4$O$_4$. The proportion of the hydrophobizing agent is preferably from 0.5 to 10% by weight, preferably from 1 to 7% by weight, based on the hydrophilic thermal-insulation moulding.

One particular embodiment of the invention provides that the process is carried out continuously, where the hydrophobic thermal-insulation moulding is a hydrophobic thermal-insulation sheet, preferably of thickness from 1 to 20 cm, and where the contact, the press process and the hydrophobizing reaction take place between two gas-permeable, moving belts of a press.

The provision of the hydrophilic thermal-insulation sheet via subjection of the thermal-insulation mixture to a press process can be achieved here as disclosed in WO2005/028195. The thermal-insulation mixture here is applied to a gas-permeable belt.

It is preferable that the contact between the resultant hydrophilic thermal-insulation sheet and the hydrophobizing agent, and the reaction of the hydrophobizing agent, is achieved in a chamber surrounding the belt. It is thus possible to use subatmospheric or superatmospheric pressure to pass the hydrophobizing agent through the hydrophilic thermal-insulation sheet. The hydrophilic thermal-insulation sheet with its coating of hydrophobizing agent is then subjected to a press process to give the final density, and during this and/or after the press process is reacted at elevated temperature.

The gas-permeable belt is composed by way of example of a solid belt, preferably of steel, without perforations, on which there is at least one woven mesh with pore diameter from 100 µm to 30 mm, on which there is at least one nonwoven or woven fabric with pore diameter from 10 µm to 450 µm. The construction of the second belt is a mirror reflection of the first belt. This design permits removal of air released when the thermal-insulation mixture is subjected to the press process, and also of gaseous reaction products formed during the hydrophobizing reaction, for example hydrogen chloride or ammonia.

EXAMPLES

The thermal-insulation mixture used is composed of 77.7% by weight of AEROSIL®300, Evonik Industries, 19.4% by weight of 900 F silicon carbide from Keyvest and 2.9% by weight of BELCOTEX 225 SC6 glass fibres from Belchem. The thermal-insulation mixture is subjected to a press process to give sheets measuring 140×90×20 mm in a press composed of female press mould, sinter plate and coat. The desired final density of the thermal-insulation sheets is 165 kg/m$^3$.

Example 1 (Comparative Example)

The final density of the sheet produced from the thermal-insulation mixture by means of the press is 165 kg/m$^3$. Press and sheet are then heated to 165° C. During this procedure, 20 g of hexamethyldisilazane (HMDS) are vaporized. The female press mould is evacuated to a subatmospheric pressure of 6 mbar, and the vaporized HMDS is sucked through the sheet. After 10 min a sheet can be removed after depressurization. Determination of water-methanol wettability of various samples of this sheet reveals adequately good hydrophobization.

Example 2

The density of the sheet produced from the thermal-insulation mixture by means of the press is 130 kg/m$^3$, corresponding to 80% of the final density. The temperature of press and sheet is about 20° C. 20 g of HMDS are vaporized. The female press mould is evacuated to a subatmospheric pressure of 6 mbar, and the vaporized HMDS is sucked through the sheet. After 10 min the material is compacted to the final density of 165 kg/m$^3$, and then the sheet is heated to 165° C. After 10 min a hydrophobic sheet can be removed. Determination of water-methanol wettability of various samples of this sheet reveals uniform hydrophobization of the entire product. Water-methanol wettability is about 30% by volume of methanol.

Example 3

The density of the sheet produced from the thermal-insulation mixture by means of the press is 100 kg/m$^3$, corresponding to 60% of the final density. The temperature of press and sheet is about 80° C. 20 g of HMDS are vaporized. The female press mould is evacuated to a subatmospheric pressure of 6 mbar, and the vaporized HMDS is sucked through the sheet. After 10 min the material is compacted to the final density of 165 kg/m$^3$, and then the sheet is heated to 165° C. Determination of water-methanol wettability of various samples of this sheet reveals uniform hydrophobization of the entire product.

Water-methanol wettability is about 30% by volume of methanol.

The invention claimed is:
1. A process for producing a hydrophobic thermal-insulation molding, comprising:
   contacting a hydrophilic thermal-insulation molding with a hydrophobizing agent in the form of vapor, thereby forming a thermal-insulation molding coated with the hydrophobizing agent;
   pressing the thermal-insulation molding coated with the hydrophobizing agent; and
   during and/or after the pressing, heating the thermal-insulation molding coated with the hydrophobizing agent, thereby forming the hydrophobic thermal-insulation moulding molding,
   wherein
   the hydrophilic thermal-insulation molding comprises a thermal-insulation mixture comprising a fine-particle silica, IR opacifier and fiber material, the contacting, the pressing, and the heating take place between two gas-permeable moving belts of a press, a density of the hydrophobic thermal-insulation molding the heating is from 100 to 250 kg/m$^3$, and a density of the hydrophilic thermal-insulation molding contacted with the hydrophobizing agent is from 50% to less than 100% of the density of the hydrophobic thermal-insulation molding.

2. The process according to claim 1, wherein in the contacting, a contact temperature $T_{contact}$ is from −30° C. to 150° C.

3. The process according to claim 1, wherein in the heating, a reaction temperature $T_{reaction}$ is from 50° C. to 500° C.

4. The process according to claim 1, wherein a contact time during the contacting and a heating time during the heating are in each case from 1 minute to 1 hour.

5. The process according to claim 1, wherein the contacting and the heating take place in a chamber, and wherein the hydrophobizing agent is introduced into the chamber until a pressure difference Δp is ≥20 mbar, wherein Δp=p$_2$−p$_1$, and p$_1$=pressure in the chamber before the introduction of the hydrophobizing agent, and p$_2$=pressure in the chamber at which the introduction of the hydrophobizing agent is stopped.

6. The process according to claim 1, wherein the fine-particle silica is a fumed silica.

7. The process according to claim 1, wherein a proportion of the fine-particle silica, based on the thermal-insulation mixture, is from 70 to 95% by weight.

8. The process according to claim 1, wherein a proportion of the IR opacifier, based on the thermal-insulation mixture, is from 2 to 20% by weight.

9. The process according to claim 1, wherein a proportion of the fiber material, based on the thermal-insulation mixture, is from 3 to 10% by weight.

10. The process according to claim 1, wherein the hydrophobizing agent is at least one organosilicon compound selected from the group consisting of $R_n$—Si—$X_{4-n}$ and $R_3$Si—Y—Si$R_3$, wherein n=from 1 to 3; R=—CH$_3$ or —C$_2$H$_5$; X=—Cl, —Br, —OCH$_3$, —OC$_2$H$_5$, or —OC$_3$H$_8$; and Y=NH or O.

11. The process according to claim 1, wherein a proportion of the hydrophobizing agent, based on the hydrophilic thermal-insulation molding, is from 0.5 to 10% by weight.

12. The process according to claim 1, which is carried out continuously.

13. The process according to claim 2, wherein in the heating, a reaction temperature $T_{reaction}$ is from 50° C. to 500° C.

14. The process according to claim 2, wherein a contact time during the contacting and a heating time during the heating are in each case from 1 minute to 1 hour.

15. The process according to claim 3, wherein a contact time during the contacting and a heating time during the heating are in each case from 1 minute to 1 hour.

16. The process according to claim 2, wherein the contacting and the heating takes place in a chamber, and wherein the hydrophobizing agent is introduced into the chamber until a pressure difference Δp is ≥20 mbar, wherein Δp=p$_2$−p$_1$, and p$_1$=pressure in the chamber before the introduction of the hydrophobizing agent, p$_2$=pressure in the chamber at which the introduction of the hydrophobizing agent is stopped.

17. The process according to claim 3, wherein the contacting and the heating takes place in a chamber, and wherein the hydrophobizing agent is introduced into the chamber until a pressure difference Δp is ≥20 mbar, wherein Δp=p$_2$−p$_1$, and p$_1$=pressure in the chamber before the introduction of the hydrophobizing agent, p$_2$=pressure in the chamber at which the introduction of the hydrophobizing agent is stopped.

18. The process according to claim 13, wherein the contacting and the heating takes place in a chamber, and wherein the hydrophobizing agent is introduced into the chamber until a pressure difference Δp is ≥20 mbar, wherein Δp=p$_2$−p$_1$, and p$_1$=pressure in the chamber before the introduction of the hydrophobizing agent, p$_2$=pressure in the chamber at which the introduction of the hydrophobizing agent is stopped.

19. The process according to claim 2, wherein the fine-particle silica is a fumed silica.

20. The process according to claim 3, wherein the fine-particle silica is a fumed silica.

* * * * *